(12) United States Patent
Rathje et al.

(10) Patent No.: US 9,381,772 B2
(45) Date of Patent: Jul. 5, 2016

(54) RIM, VEHICLE WHEEL, AND VEHICLE WITH SUCH A RIM

(71) Applicant: VOLKSWAGEN AG, Wolfsburg (DE)

(72) Inventors: Volker Rathje, Gifhorn (DE); Alina Hallbauer, Wolfsburg (DE); Franz-Josef Ertelt, Wolfsburg (DE); Martin Brause, Wolfenbüttel (DE); Mark-Ulf Goebel, Bad Harzburg (DE); Hans-Walter Wodtke, Hennef (DE)

(73) Assignee: VOLKSWAGEN AG, Wolfsburg (DE)

( * ) Notice: Subject to any disclaimer, the term of this patent is extended or adjusted under 35 U.S.C. 154(b) by 106 days.

(21) Appl. No.: 14/350,570

(22) PCT Filed: Sep. 27, 2012

(86) PCT No.: PCT/EP2012/004047
§ 371 (c)(1),
(2) Date: Apr. 9, 2014

(87) PCT Pub. No.: WO2013/053436
PCT Pub. Date: Apr. 18, 2013

(65) Prior Publication Data
US 2014/0300177 A1    Oct. 9, 2014

(30) Foreign Application Priority Data

Oct. 10, 2011   (DE) .......................... 10 2011 115 383
Apr. 20, 2012   (DE) .......................... 10 2012 007 990

(51) Int. Cl.
*B60B 21/02*   (2006.01)
*B60B 21/12*   (2006.01)

(52) U.S. Cl.
CPC ............... *B60B 21/12* (2013.01); *B60B 21/023* (2013.01); *B60B 2900/133* (2013.01); *B60B 2900/313* (2013.01)

(58) Field of Classification Search
CPC ............................. B60C 19/002; B60B 21/12
See application file for complete search history.

(56) References Cited

U.S. PATENT DOCUMENTS

| 4,896,921 | A  | 1/1990  | Sato et al.     |
| 7,152,643 | B2 | 12/2006 | Morinaga et al. |

(Continued)

FOREIGN PATENT DOCUMENTS

| EP | 1990213 A1 | 11/2008 |
| EP | 2052876 A1 | 4/2009  |

(Continued)

OTHER PUBLICATIONS

Search Report for German Patent Application No. 10 2012 007 990.7; Nov. 26, 2012.

(Continued)

*Primary Examiner* — Jeffrey J Restifo
*Assistant Examiner* — Erez Gurari
(74) *Attorney, Agent, or Firm* — Barnes & Thornburg LLP

(57) ABSTRACT

A rim onto which a vehicle tire is pulled or can be pulled. The rim has a rim base with at least one device to absorb sound in the manner of a Helmholtz resonator, an air volume partly ring-shaped and at least one opening into the tire interior. The air volume of the Helmholtz resonator is formed by the rim base, by wall and/or web elements, which are arranged on the rim base at a distance from one another when seen in the axial direction of the rim, which are radially oriented, and which are at least partly circumferential, and by a covering element or by a covering element and transverse walls, which delimit the air volume in the circumferential direction. The covering element may be connected to the wall and/or web elements in a form-fitting manner or in a form-fitting and force-fitting manner and in an airtight manner.

14 Claims, 7 Drawing Sheets

(56) References Cited

U.S. PATENT DOCUMENTS

| | | | |
|---|---|---|---|
| 7,896,044 B2 * | 3/2011 | Kashiwai | B60B 3/04 152/381.6 |
| 2010/0090520 A1 | 4/2010 | Kamiyama et al. | |
| 2010/0096909 A1 | 4/2010 | Kamiyama et al. | |
| 2011/0057505 A1 | 3/2011 | Nagata et al. | |

FOREIGN PATENT DOCUMENTS

| | | |
|---|---|---|
| JP | 2002079802 A | 3/2002 |
| JP | 2003326907 A | 11/2003 |
| JP | 2004090669 A | 3/2004 |
| JP | 2006231966 A | 9/2006 |
| JP | 2007145190 A | 6/2007 |
| JP | 2007145191 A | 6/2007 |
| JP | 2008143286 A | 6/2008 |
| JP | 2009248848 A | 10/2009 |

OTHER PUBLICATIONS

Search Report for International Patent Application No. PCT/EP2012/004047; Feb. 20, 2013.

* cited by examiner

RIM, VEHICLE WHEEL, AND VEHICLE WITH SUCH A RIM

PRIORITY CLAIM

This patent application is a U.S. National Phase of International Patent Application No. PCT/EP2012/004047, filed 27 Sep. 2012, which claims priority to German Patent Application No. 10 2011 115 383.0, filed 10 Oct. 2011 and German Patent Application No. 10 2012 007 990.7, filed 20 Apr. 2012, the disclosures of which are incorporated herein by reference in their entirety.

SUMMARY

Illustrative embodiments relate to a rim, onto which a vehicle tire is pulled or can be pulled. Furthermore, illustrative embodiments relate to a vehicle wheel or to a vehicle having a rim of this type.

BRIEF DESCRIPTION OF THE DRAWINGS

Disclosed embodiments will be explained using the exemplary embodiments which are shown diagrammatically in the drawings. However, the invention is not restricted to the exemplary embodiments, but rather also comprises all refinements defined by the patent claims. In the drawings:

DETAILED DESCRIPTION OF THE DISCLOSED EMBODIMENTS

Figure 1:
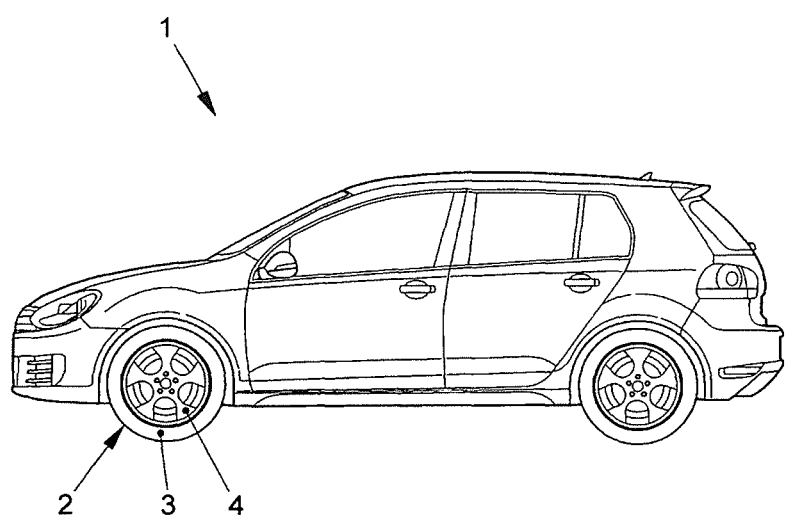
FIG. 1 shows a vehicle in a side view, the vehicle wheels have a rim which is configured in accordance with the disclosed embodiments.

Disclosed embodiments provide a rim which is improved further with regard to the prior art having at least one device for the absorption of sound in a Helmholtz resonator, the outlay of which on material, installation and accordingly cost is minimized for configuring the at least one Helmholtz resonator.

Proceeding from a rim, onto which a vehicle tire is pulled or can be pulled, the rim having a rim well, on which at least one device for absorbing sound in the manner of a Helmholtz resonator with an at least partially annular air volume and at least one in particular narrow opening to the tire interior is arranged, and the air volume of the Helmholtz resonator being formed by the rim well, by radially oriented and at least partially circumferential wall and/or web elements which are arranged spaced apart from one another on the rim well as viewed in the axial direction of the rim, and by a cover element or by a cover element and transverse walls which delimit the air volume in the circumferential direction, the object which is set is achieved by virtue of the fact that the cover element is connected to the wall and/or web elements in a positively locking manner or in a positively locking and non-positive manner, and in an airtight manner.

As a result of this measure, with a reduced weight, both the installation costs and the outlay on material for configuring the at least one Helmholtz resonator are advantageously minimized, since the installation is restricted to the positively locking or positively locking and non-positive joined connection of merely one cover element to the wall and/or web elements.

According to at least one disclosed embodiment, the cover element has, for the radially and axially fixed connection of the cover element to the rim, side webs which are positioned radially and run in the circumferential direction of the rim with axially outwardly pointing positively locking means in the form of latching elements which for their part latch with groove-shaped cutouts which are provided in the wall and/or web elements by radial placing of the cover element onto a circumferential groove which is formed by the wall and/or web elements and the rim well. This has the advantage of assembly of the cover element on the rim which is simple and cost-effective to manage.

In a second disclosed embodiment, the cover element firstly has, for the radially fixed connection of the cover element to the rim, side webs which are positioned radially and run in the circumferential direction of the rim, the free end of which side webs is formed in each case by an axially positioned flange, the flanges being oriented in the same direction and penetrating, by way of an axial displacement of the cover element relative to the rim, into in each case one groove-shaped cutout which is provided in the wall and/or web elements, and secondly has, for the axially fixed connection of the cover element to the rim, a multiplicity of snap-in tabs which are arranged one behind another as viewed in the circumferential direction of the rim and point counter to the displacement direction, the free end of which snap-in tabs is snapped into a corresponding receiving groove of the rim in the mounted state of the cover element. As a result of this measure, a particularly effective positively locking connection or positively locking and non-positive connection between the cover element and the rim is to be observed. Moreover, this joined connection can be released again extremely simply if required. In one development of this design variant, the snap-in tabs are configured in one piece with the cover element, which results, in particular, in savings of material and assembly costs. To bring about the fixing of the snap-in tabs quickly and inexpensively, a receiving groove which corresponds to the snap-in tabs is formed by at least one wall or web element which is positioned radially to the outside, starting from the rim well, and runs around at least partially in the circumferential direction of the rim. The web element may be configured integrally with the rim. To ensure the releasable joined connection even in the case of higher loadings, in particular high radial forces, it is provided that the axially positioned flange which is arranged on that side of the cover element which lies axially opposite the snap-in tabs merges into an end flange which is positioned radially to the outside. As a result of this measure, in the case of high centrifugal forces and unavoidable deformation of the cover element radially to the outside, as it were "interlocking" of the end flange in the associated groove-shaped cutout is to be observed.

To bring about a highly effective airtight connection between the cover element and the adjoining contact sections of the wall and/or web elements and/or the rim well, at least one sealing element is provided according to at least one disclosed embodiment. To reduce the number of components of the Helmholtz resonator, it is provided in at least one disclosed embodiment that the cover element has transverse walls, which are configured in one piece with the cover element, for delimiting the air volume, which transverse walls for their part are supported with their free end on the rim well. Solely as a result of the mounting of the cover element, as a result, the transverse walls are realized which delimit the respective air volume on the end side as viewed in the circumferential direction. Furthermore, it is provided in at least one disclosed embodiment that the at least one sealing element extends as far as into the contact region of the transverse walls of the cover element with the rim well, as a result of which particularly effective sealing is ensured. One expedient modification of the disclosed embodiment is achieved by virtue of the fact that the transverse walls which are formed by the cover element run in a radially oblique manner toward the rim well and are supported on the latter. As a result of this measure, the sealing action between the transverse walls and the rim well can be improved yet further, by the transverse walls bearing tightly against the rim well under prestress as a consequence of the positively locking or positively locking and non-positive joined connection. According to another disclosed embodiment, the at least one sealing element is configured as a separate attachment component or in one piece with the cover element. If a separate sealing element is favored, the sealing element can be replaced simply and inexpensively, for example in the case of repair. If, in contrast, a sealing element which is configured in one piece with the cover element, for example a sealing element which is injection molded onto the cover element in accordance with a plastic injection molding process, is provided, the number of components and the assembly time are advantageously reduced. According to at least one disclosed embodiment, the cover element is of cup-like or shell-like configuration. This has the advantage that, solely as a result of this configuration of the cover element, high dimensional stability of the cover element is achieved, which high dimensional stability in turn advantageously serves to maintain the required volumetric constancy of the air volume of the Helmholtz resonator. To increase the dimensional stability of the cover element yet further, according to another disclosed embodiment, the cover element has one or more means for reinforcement, such as cambers, reinforcing webs, reinforcing beads and/or the like. To this extent, it is expedient to configure the cover element from metal and/or plastic and/or a composite material. On account of their material properties or their adjustable material properties, the materials make simple and inexpensive production and assembly possible of a dimensionally stable cover element of this type.

Disclosed embodiments also provide a vehicle wheel or to a vehicle having a rim of the type described in the above text.

FIG. 1 first of all shows a vehicle 1 having vehicle wheels 2, the tires 3 of which are pulled in each case onto a rim 4 which is configured in accordance with the disclosed embodiments. The rim 4 is predominantly manufactured from metal, for example light metal casting, from a plastic, in particular fiber-reinforced plastic, or else from a combination of the materials. According to FIGS. 2 and 3, the rim 4 has a rim well 5, rim flanges 6 and a wheel disk 7. To minimize disruptive sound which emanates from the respective vehicle wheel 2 or from the tire 3/rim 4 system, which sound for its part results, in particular, from the torus resonance in the tire interior 8 which is formed between the tire 3 and the rim 4, at least one device for absorbing sound in the manner of a Helmholtz resonator 9 is arranged on the rim well 5, with an at least partially annular air volume 10 as viewed in the circumferential direction of the rim well 5 and at least one, in particular narrow, opening 11 to the tire interior 8.

Exemplary Embodiment 1

In accordance with the first exemplary embodiment (shown in FIGS. 2 to 4e) of the Helmholtz resonator 9, the latter encloses the rim well 5 merely partially, since two or more Helmholtz resonators 9 which are arranged distributed uniformly over the circumference of the rim well 5 are favored here. In the present case, a Helmholtz resonator 9 of this type has a wall element 12 which is configured in one piece with the rim well 5 and, spaced apart herefrom as viewed in the axial direction of the rim 4, a web element 13 which is configured in one piece with the rim well 5. It goes without saying that it is also possible, in contrast, to provide two wall elements 12 or web elements 13 which are arranged spaced apart from one another (not shown in the drawing). The wall and web element 12, 13 of each Helmholtz resonator 9 are oriented radially and are of at least partially circumferential configuration. Furthermore, a cover element 14 and transverse walls 15 which delimit the air volume 10 in the circumferential direction are provided to configure each Helmholtz resonator 9.

If, in contrast, merely a single Helmholtz resonator 9 which encloses the rim well 5 completely as viewed in the circumferential direction of the rim well 5 is favored, the transverse walls 15 can understandably be dispensed with (not shown in the drawing).

Figure 2:
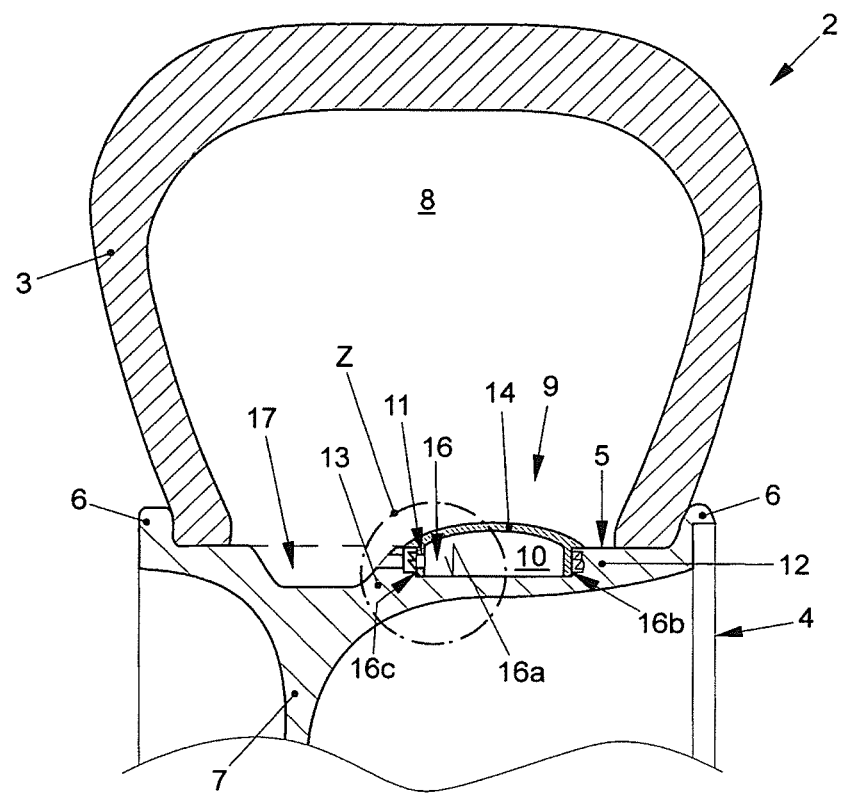
FIG. 2 shows a vehicle wheel having a rim which is configured in accordance with the disclosed embodiments, in a side view (exemplary embodiment 1)

The wall element 12 merges axially to the outside into a rim flange 6. In contrast, the web element 13 separates two annular or partially annular recesses 16, 17 in the rim well 5 from one another. The recess 16 which is arranged between the wall element 12 and the web element 13 has a recess bottom 16a and two radially oriented side walls 16b, 16c which for their part are formed by the wall or web element 12, 13 (FIG. 2).

The cover element 14 is for its part of cup-like configuration and has a covering face 14a, two side webs 14b which may be arranged orthogonally with respect to the covering face 14a, and transverse webs 14c or, with regard to the mounted state of the cover element 14 on the rim 4, radially positioned side webs 14b and transverse webs 14c. The side and transverse webs 14b, 14c are connected annularly among one another and on the end side to the covering face 14a in such a way that the covering face 14a forms at least one lateral projection 18 beyond the side webs 14b (FIGS. 4a to 4e). Furthermore, positively locking means 19 are provided on the side webs 14b in the region of the side webs 14b. In the present case, the positively locking means 19 are formed by two rows arranged one above another of axially outwardly pointing hook-shaped latching elements which correspond with one or two groove-shaped cutouts 20 in the wall and web element 12, 13.

Figure 4A:
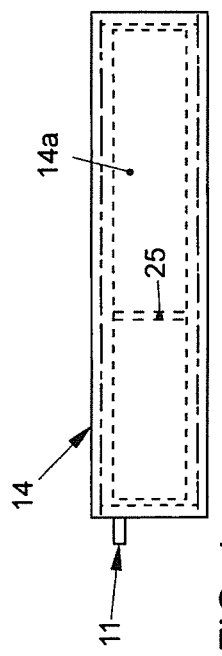
FIGS. 4a-4e show a cover element which is essential to the present disclosure of the Helmholtz resonator of the rim according to FIG. 2, as an individual part in a plan view, side view, end view and bottom view.
Figure 4D:
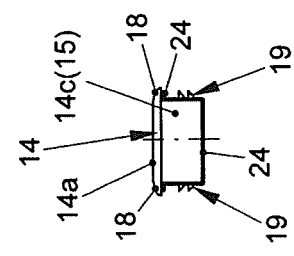
Figure 4B:
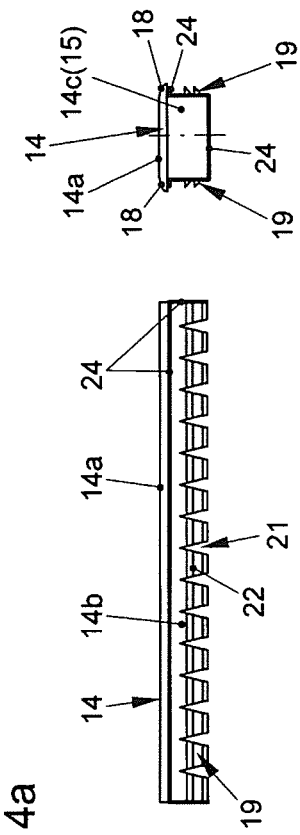

As can be gathered further, in particular, from FIG. 4b, the side webs 14b are of toothed configuration, as it were, with conically or triangularly configured intermediate spaces 21 between the individual teeth 22. As a result, it is made possible for a prefabricated, elongate cup-shaped cover element 14 of the above-described type which is relatively flexurally rigid per se to bear tightly, during the mounting of the cover element 14 onto the rim 4, against the circumferential contour of the rim 4 or its wall and web elements 12, 13 as a result of bending of the cover element 14. Here, a cover element 14 of this type can also advantageously be used for rims 4 with a rim well 5 of different radius.

During the mounting of the cover element 14 onto the rim 4 which is configured with the wall and web element 12, 13, the cup-shaped cover element 14 is clipped radially onto the circumferential groove which is formed by the wall and web element 12, 13 and the rim well 5, by the positively locking means 19, in the present case the hook-shaped latching elements, penetrating in a positively locking or latching manner into the groove-shaped cutouts 20 in the wall and web element 12, 13 respectively. At the same time, the projection 18 of the covering face 14a bears tightly radially against the corresponding contact face 23 of the wall and web element 12, 13. The transverse walls 15 mentioned in the above text of the Helmholtz resonator 9 are formed by the transverse webs 14c of the cover element 14, by their free ends being supported radially on the rim well 5.

According to at least one disclosed embodiment, the cover element 14 is produced from a plastic which is substantially dimensionally stable but is resilient within limits, according to a plastic injection molding process, for example. A material of this type makes the latching possible as a result of a certain axial prestress of the side webs 14b of the cover element 14 against the wall and web element 12, 13. As a result, both a positively locking connection and a non-positive connection are brought about between the cover element 14 and the wall and web element 12, 13.

To form the Helmholtz resonator 9, volume constancy of the air volume 10 and an airtight connection of the cover element 14 to the rim 4 or its wall and web element 12, 13 and its rim well 5 are imperative. To this extent, the cover element 14 is also fastened to the rim 4 under radial prestress according to a first design variant. This means firstly that the projection 18 of the covering face 14a bears tightly radially under prestress against the corresponding contact face 23 of the wall and web element 12, 13. Secondly, the transverse webs 14c of the cover element 14 which form the transverse walls 15 are supported radially on the rim well 5 under prestress.

Figure 3:
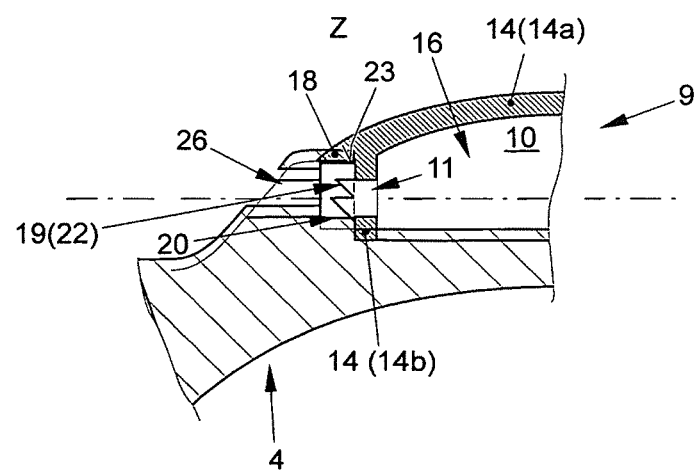
FIG. 3 shows the detail "Z" according to FIG. 2.
Figure 4C:
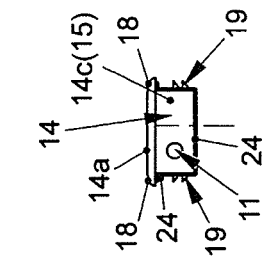
Figure 4E:
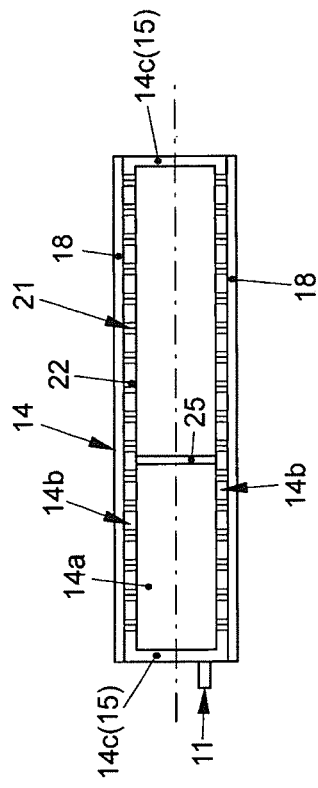

According to another disclosed embodiment, the cover element 14 is assigned at least one sealing element 24 in addition to the radial prestress or else on its own (in particular, FIGS. 4b to 4d). The at least one sealing element 24 can be configured as a separate attachment component and can be composed, for example, as an annular attachment component of an elastomeric plastic, foam or of rubber (not shown in the drawings). However, the sealing element 24 may be configured in one piece with the cover element 14. If, accordingly, a cover element 14 made from plastic is favored, the sealing element 24 can be injection molded, for example, as an elastomeric plastic soft component to a plastic hard component of the cover element 14 per se in the region of the contact faces of the cover element 14 with the rim 4. As a result, inexpensive production and simple mounting of the cover element 14 with the rim 4 are made possible. It goes without saying that the cover element 14 can also be composed of metal, in particular a formed metal sheet, or of a composite material, for example a fiber-reinforced plastic, and can have one or more mounted or injection molded sealing elements 24. Furthermore, the cover element 14, in particular its covering face 14a, can also have means 25 for reinforcement, to ensure the volume constancy, such as web elements (cf., in particular, FIGS. 4a, 4e), cambers (FIGS. 2 and 3) and/or the like.

The required narrow opening 11 of the Helmholtz resonator 9 to the tire interior 8 is arranged, according to FIG. 3, in that side web 14b of the cover element 14 which points toward the web element 13 of the rim 4, and corresponds with a through opening 26 in the web element 14. Here, the through opening 26 ends in the annular or partially annular recess 17 of the rim well 5. However, the disclosed embodiments are not restricted to this arrangement of the narrow opening 11 of the Helmholtz resonator 9, but rather also comprises an opening 11 in a transverse web 14c of the cover element 14, which opening 11 can be configured in the manner of a small tube, moreover, as in the present case (cf. FIGS. 4a to 4e). The opening 11 can likewise also be arranged in the covering face 14a of the cover element 14 (not shown in the drawings with regard to this exemplary embodiment).

Exemplary Embodiments 2 to 4

FIGS. 5a to 7b show further exemplary embodiments of the Helmholtz resonator 9 which is formed on the rim 4, functionally identical parts being denoted by the same designations as with respect to the above-described exemplary embodiments.

The exemplary embodiments according to FIGS. 5a to 7b differ substantially from those described above in that the cover element 14 is now of shell-like configuration. Merely by way of example, the cover element 14 which is now of shell-like shape is supported on two web elements 13, 13' which are arranged spaced apart from one another axially. The web elements 13, 13' are likewise configured in one piece with the rim 4 and protrude radially to the outside out of the rim well 5. The shell-shaped cover element 14 can be composed in a relatively thin-walled manner of a plastic, metal, composite material or a combination thereof.

As has already been described with respect to the above exemplary embodiment, this cover element 14 is also connected in a positively locking manner or in a positively locking and non-positive manner to the web elements 13, 13'. To ensure the required rigidity of the cover element 14 and the required volume constancy, the cover element 14 likewise has means 25 for reinforcement, such as cambers or convexly or concavely configured bulges (cf. FIGS. 5a, 5c, 6), beads (cf. FIG. 5b), web elements or material accumulations which are not shown in further detail and/or other suitable means 25 for reinforcement which are known per se. Moreover, the side edges 27 of the cover element 14 have in each case one elongate positively locking means 19 which corresponds with a correspondingly adapted elongate cutout 20 in the web elements 13, 13' (cf., in particular, FIG. 6).

Figure 7A:
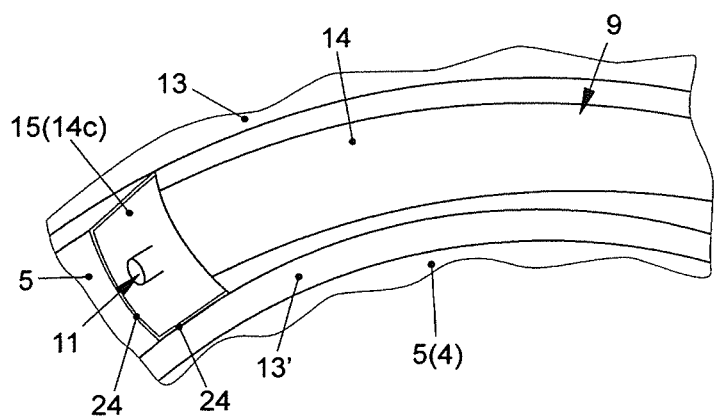
FIGS. 7a-7b shows a perspective plan view of the cover element according to FIG. 5a which is installed on the rim, with a narrow opening to the tire interior in two expedient arrangement variants thereof.
Figure 7B:
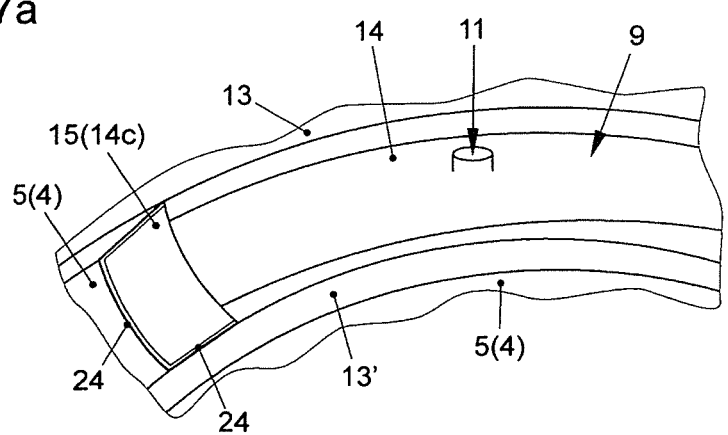

As can also be gathered from FIGS. 7a and 7b, the transverse walls 15 are also formed here by the cover element 14 which is now of shell-like shape or by its free ends. In the present case, the transverse walls 15 run in a radially oblique manner toward the rim well 5 and are supported on the latter. As a result of this special configuration of the cover element 14, the transverse walls 15 can be pressed particularly satisfactorily onto the rim well 5 with prestress during the mounting of the cover element 14. Here, as indicated in FIGS. 7a and 7b, the two transverse walls 15 of each cover element 14 can be directed away from one another or else toward one another as viewed in the circumferential direction (not shown in the drawing).

Figure 6:
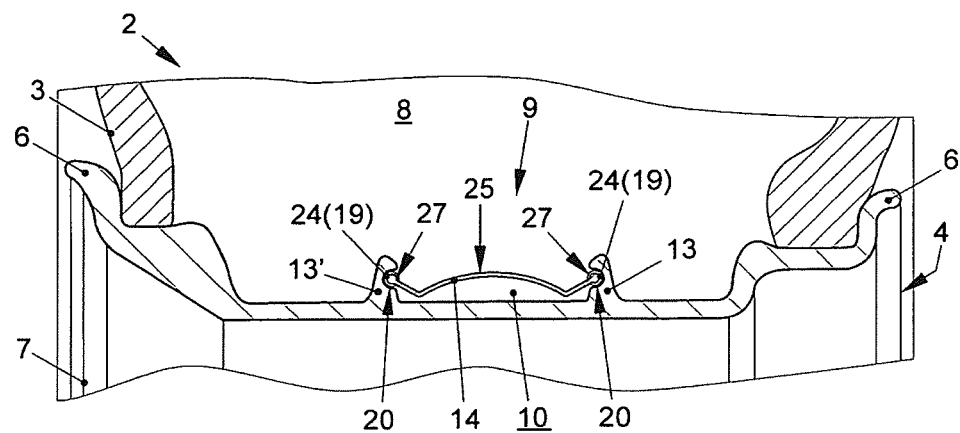
FIG. 6 shows the cover element according to FIG. 5a in a more detailed illustration.

One sealing element 24, for example an injection molded elastomeric soft component made from plastic, may be provided in the region of the side edges 27 of the shell-shaped cover element 14 (FIG. 6). In a manner which is readily comprehensible to a person skilled in the art, it may be suitable, in particular, to configure the sealing element 24 circumferentially on the edge of the cover element 14, as a result of which simple and effective sealing of all contact faces of the cover element 14 with the rim 4, that is to say also of the contact faces with the rim well 5 is made possible. Regardless of this, in contrast, sealing elements 24 which are produced separately and can be attached, for example can be inserted into the cutout 20, and are made from an elastomeric plastic, foam or rubber are also conceivable here.

As far as the narrow opening 11 which is required for the Helmholtz resonator 9 is concerned, the opening 11 is provided in a transverse wall 15 according to FIG. 7a and in the covering face 14a of the cover element 14 according to FIG. 7b. Merely by way of example, the opening 11 is also formed here by a small tube. With regard to all the above-described exemplary embodiments, the narrow opening 11 can be configured in one piece with the cover element 14, as in the present case, or can also be formed by a separately produced attachment part (not shown in the drawings).

With regard to the favored mounting method, all the above-described cover elements 14 are focused on a radially directed mounting movement to the wall and/or web elements 12, 13 and following positively locking or positively locking and non-positive latching of the cover element 14 to the wall and/or web elements 12, 13. In contrast, there is also the possibility of pushing the cover element 14 by way of an advancing movement in the circumferential direction of the rim well 5 into prepared cutouts 20 or guide grooves of the wall and/or web elements 12, 13, as a result of which the positively locking connection or positively locking and non-positive connection can be improved yet further, since latching formations of the cover element 14 which are conventionally to be ensured can now be dispensed with. In this case, corresponding leads to the cutouts 20 or guide grooves of the wall and/or web elements 12, 13 and/or structural freedom with regard to any adjacent Helmholtz resonators 9 as viewed in the circumferential direction are understandingly to be provided (not shown in the drawings).

Exemplary Embodiment 5

FIGS. 8 to 12b show a fifth exemplary embodiment of the Helmholtz resonator 9 which is formed on the rim 4, functionally identical parts being denoted by the same designations as with respect to the above-described exemplary embodiments. According to FIG. 8, a plurality of, optionally four, Helmholtz resonators 9 which are arranged distributed uniformly over the circumference of the rim 4 are provided here.

Figure 9:
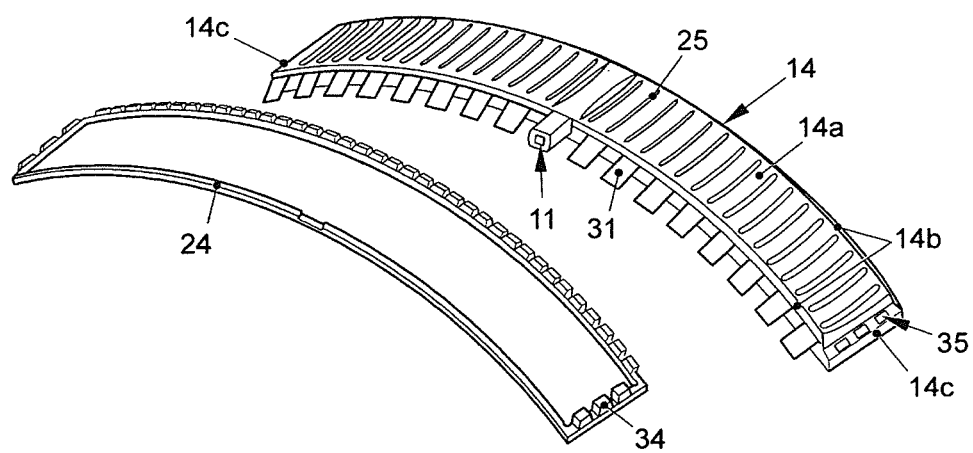
FIG. 9 shows a cover element which is essential to the present disclosure of a Helmholtz resonator of the rim according to FIG. 8 including a sealing element, in a perspective exploded illustration.
Figure 10:
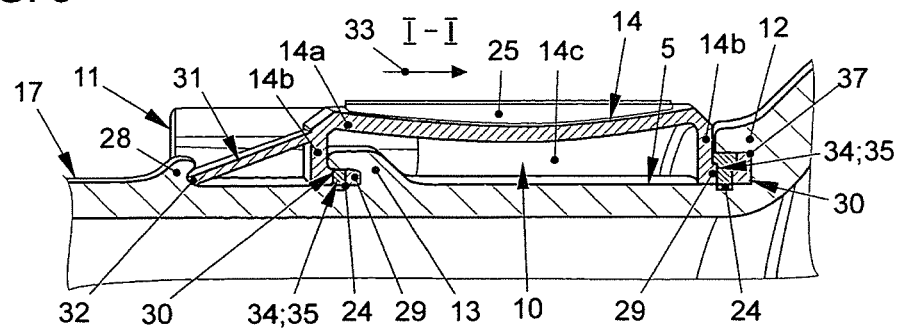
FIG. 10 shows a sectional illustration of the rim including cover element and sealing element, along the sectional line "I-I" according to FIG. 8.

According to FIGS. 9 and 10, each Helmholtz resonator 9 has, in the style of the first exemplary embodiment, first of all a wall element 12 which is configured in one piece with the rim well 5 and, spaced apart therefrom as viewed in the axial direction of the rim 4, a web element 13 which is configured in one piece with the rim well 5. The wall and web element 12, 13 of each Helmholtz resonator 9 are oriented radially and are of at least partially circumferential configuration. Furthermore, a cover element 14 and transverse webs 14c which delimit the air volume 10 in the circumferential direction are provided to form each Helmholtz resonator 9.

The wall element 12 merges axially to the outside into a rim flange 6. A partially annular recess 16 is formed in the rim well 5 between the wall element 12 and the web element 13. In contrast to the first exemplary embodiment according to FIG. 2, the recess 17 which adjoins the web element 13 axially is of split configuration according to this exemplary embodiment. The split is formed by a web element 28 which is positioned radially to the outside, starting from the rim well 5, and runs around at least partially in the circumferential direction of the rim 4, which web element 28 will be described in greater detail further below. The web element 28 may be configured integrally with the rim 4.

Furthermore, each Helmholtz resonator 9 has, in the style of the first exemplary embodiment, a cover element 14 which may be composed of plastic, in particular fiber-reinforced plastic, such as a glass-fiber-reinforced polyamide (PA6-GF3). The cover element 14 is of cup-like configuration and has a covering face 14a, two side webs 14b which may be arranged orthogonally with respect to the covering face 14a, and transverse webs 14c or, with regard to the mounted state of the cover element 14 on the rim 4, radially positioned side webs 14b and transverse webs 14c. The covering face 14a of the cover element 14 is configured concavely, that is to say curved toward the rim well 5 or radially to the inside. Means 25 for reinforcement, in the present case a plurality of reinforcing webs which are configured integrally with the covering face 15a and are arranged one behind another as viewed in the circumferential direction of the rim 4, are provided on the covering face 14a. Here, the reinforcing webs extend in each case in a plane which is laid into the rotational axis of the rim 4.

The free end of each side web 14b is formed by an axially positioned flange 29. The two flanges 29 are oriented in the same direction and, according to this exemplary embodiment, point in the direction of the wall element 12. The axially positioned flanges 29 are assigned in each case one groove-shaped cutout 30 in the wall element 12 and in the web element 13, which groove-shaped cutout 30 is delimited at the bottom by the rim well 5.

Moreover, the cover element 14 has a plurality of snap-in tabs 31 which are arranged one behind the other as viewed in the circumferential direction of the rim 4 and, starting from that side web 14b of the cover element 14 which is arranged remotely from the wall element 12, extend axially away from the wall element 12. The free end of each snap-in tab 31 corresponds with a receiving groove 32 in the rim 4. In the present case, the receiving groove 32 is formed by the above-mentioned web element 28. The snap-in tabs 31 may be configured integrally or in one piece with the cover element 14.

To mount the cover element 14 on the rim 4, the cover element 14 is first of all positioned by the worker with its side webs 14b on the rim well 5, to be precise in such a way that one side web 14b is arranged between the wall element 12 and the web element 13 and the other side web 14b is arranged between the web elements 13 and 28, the axially positioned flanges 29 of the side webs 14b pointing to the respectively associated groove-shaped cutout 30. Following this, the cover element 14 is displaced axially according to the directional arrow 33 until the axially positioned flanges 29 are received in a positively locking manner by the groove-shaped cutouts 30. As a result, the cover element 14 is fixed radially on the rim 4. The axial fixing of the cover element 14 is brought about by the free ends of the snap-in tabs 31 subsequently snapping into the receiving groove 32 of the web element 28 of the rim 4, which is brought about manually by the worker. As a result, a partially annular air volume 10 is produced.

To form the Helmholtz resonator 9, volume constancy of the air volume 10 and an airtight connection of the cover element 14 to the rim 4 or its wall and web element 12, 13 and/or its rim well 5 are imperative. According to this exemplary embodiment, the cover element 14 is assigned a sealing element 24 which is configured as a separate attachment part. The sealing element 24 is of annular configuration and is formed, for example, from an elastomeric plastic, foam or from rubber (cf., in particular, FIGS. 9 and 10). The fastening of the sealing element 24 on the cover element 14 is brought about by fastening domes 34 which are configured in one piece with the sealing element 14 and for their part are received in a positively locking manner by associated fastening openings 35 of the side webs 14b and transverse webs 14c of the cover element 14. As an alternative, the sealing element 24 can also be connected to the cover element 14 in a material-to-material manner by, in particular, adhesive bonding or else can be configured in one piece with the cover element 14, for example can be injection molded as an elastomeric plastic soft component in the region of the contact faces of the cover element 14 with the rim 4 to a plastic hard component of the cover element 14 per se (not shown in the drawings). By means of the sealing element 24, the cover element 14 is supported or its side webs 14b and transverse webs 14c are supported sealingly on the rim well 5.

Figure 8:
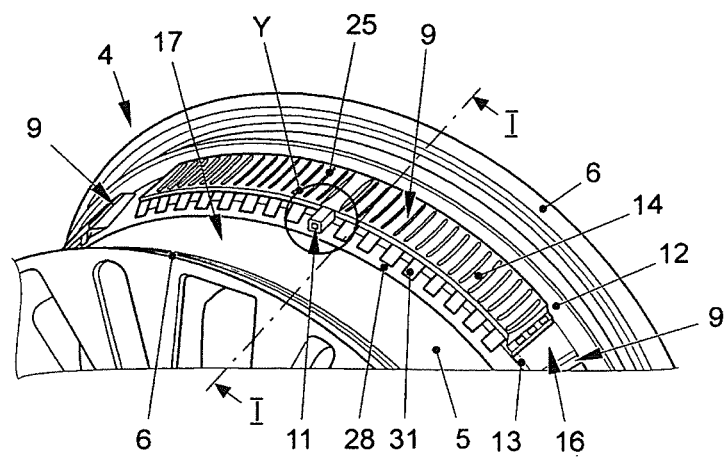
FIG. 8 shows a rim which is configured in accordance with the disclosed embodiments in a sectional view in accordance with a fifth exemplary embodiment.
Figure 11:
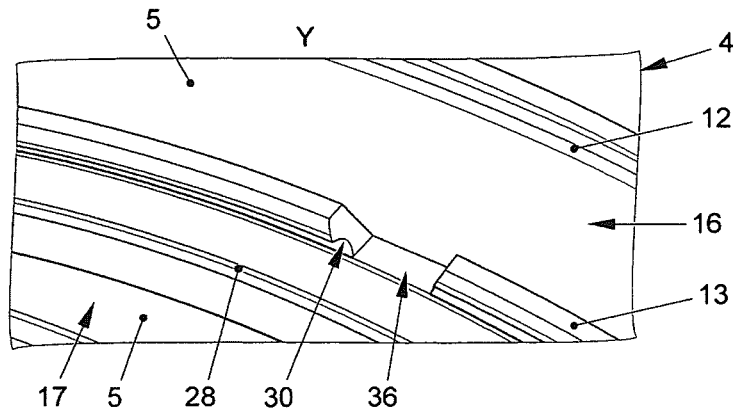
FIG. 11 shows the detail "Y" according to FIG. 8 without a cover element.

The required narrow opening 11 of the Helmholtz resonator 9 to the tire interior 8 is configured in the shape of a small tube according to FIGS. 8 to 10, the small tube in this regard extending axially into the tire interior 8 starting from the web element 13 of the rim 4. To this end, a recess 36 with a complementary shape to the outer contour of the small tube is provided in the web element 13, which recess 36 is penetrated by the small tube (FIG. 11).

As can be gathered further, in particular, from FIG. 10, the axially positioned flange 29 which is arranged on that side of the cover element 14 which lies axially opposite the snap-in tabs 31 merges into a radially outwardly positioned end flange 37, as a result of which as it were a U-profile is formed as viewed in cross section. As has already been described above, as it were "interlocking" of the end flange 37 in the associated groove-shaped cutout 30 is to be observed as a result in the case of high radial forces and unavoidable deformation of the cover element 14 radially to the outside.

Figure 12A:
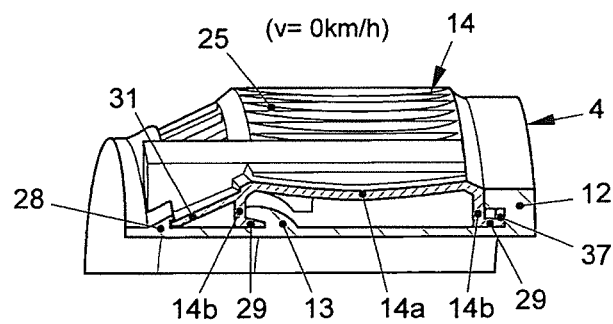
FIGS. 12a-b show the cover element in the installed situation in an operating state, in which the vehicle wheel is at a standstill, and in an operating state, in which the vehicle wheel rotates at high speed.

To this extent, FIG. 12a shows the cover element 14 in the installed situation in an operating state, in which the vehicle wheel 2 is at a standstill (driving speed "V" of the vehicle 1=0 km/h). A starting operating state of the cover element 14 of the Helmholtz resonator 9 is therefore to be observed, in which the covering face 14a of the cover element 14, which covering face 14a is provided with the reinforcing webs or the reinforcing means 25, is curved concavely, that is to say toward the rim well 5 or radially to the inside.

Figure 12B:
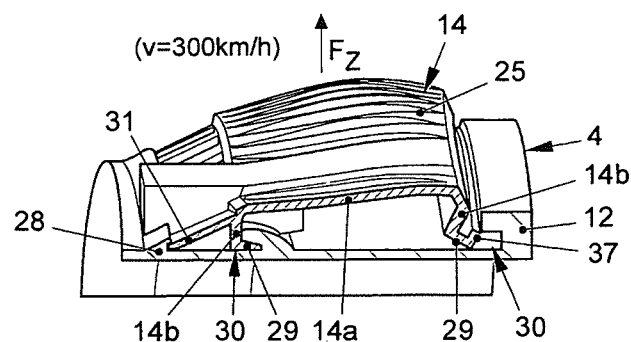

If the case is assumed where the vehicle 1 is driving, for example, at a maximum speed or limit speed "Vlimit" of approximately 300 km/h, elastic outward curving of the covering face 14a of the cover element 14 is to be observed on account of the high circulating speed of the vehicle wheel 2 and as a consequence of the high centrifugal forces "Fz" according to FIG. 12b which act on the cover element 14. Here, high tensile forces also act, in particular, on the wall element-side side web 14b of the cover element 14. By virtue of the fact that the free end of the side web 14b is of U-shaped configuration in cross section, the end flange 37 "interlocks" in the associated groove-shaped cutout 30, as a result of which undesired release of the positively locking connection between the wall element-side side web 14b and the wall element 12 and destruction of the Helmholtz resonator 9 in the case of high centrifugal forces "Fz" are prevented effectively.

Figure 5A:
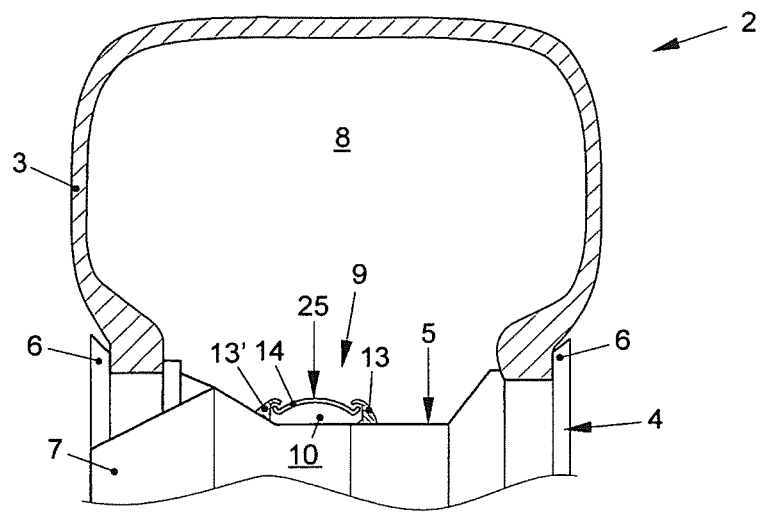
FIGS. 5a-5c extremely diagrammatically show the vehicle wheel in a sectional view with a cover element in further possible design variants (exemplary embodiments 2-4)
Figure 5B:
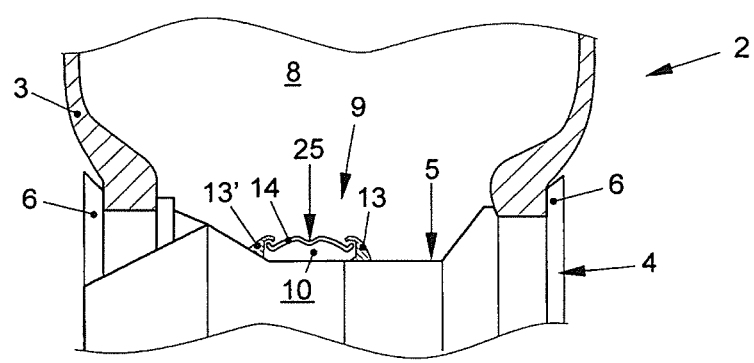
Figure 5C:
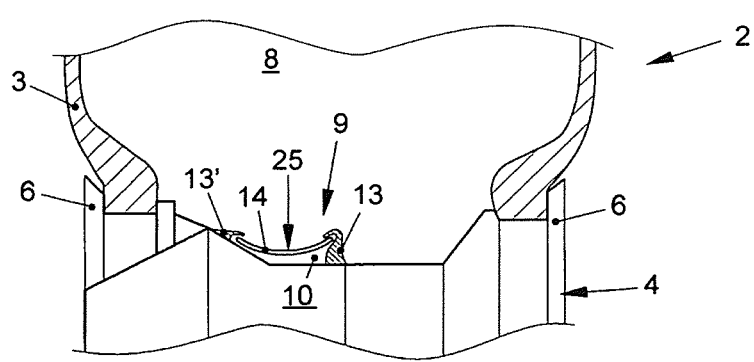

The exemplary embodiment 5 (FIGS. 8 to 10) is aimed by way of example at a Helmholtz resonator 9, the cover element 14 of which is arranged on the rim 4 in such a way that the snap-in tabs 31 are directed axially away from the wall element 12. It goes without saying that a variant which is not shown in the drawings here is also included in the present disclosure, in which variant the snap-in tabs 31 are directed toward the wall element 12 and the snap-in tabs 31 are snapped into a receiving groove 32 of the wall element 12. A cover element 14 of this type is likewise also included, which cover element 14 is not connected or supported directly on a wall element 12, but rather, in the style of the design variants 2 to 4 according to FIGS. 5a to 5c, is connected or supported exclusively on web elements 13, 13', 28, that is to say the wall element 12 is replaced by a web element 13' (not shown in the drawings).

It has been known for some time to minimize the sound emission of the vehicle wheel by means of devices which are arranged within the tire torus of a vehicle wheel for the absorption of sound, for example by means of resonance absorbers. Here, Helmholtz resonators, in particular, are proposed as resonance absorbers, which Helmholtz resonators consist substantially of an air volume which is enclosed by a container with a narrow opening to the outside. A mechanical spring mass system is produced as a result of the elasticity of the air volume in the interior of the container in combination with the inertial mass of the air which is situated in the narrow opening. The sound energy which impacts it is converted into kinetic energy of the mass. The air volume which is enclosed in the container acts as a spring.

For instance, JP 2004 090669 has disclosed a Helmholtz resonator on a vehicle wheel, in which the air volume is formed by the rim well, by two wall or web elements which are configured in one piece with the rim well, are arranged spaced apart from one another as viewed in the axial direction of the rim, are oriented radially and are circumferential, and by a cover element and transverse walls which delimit the air volume in the circumferential direction. The cover element is adhesively bonded by means of an elastomeric adhesive to the circumferential U-profile which is formed by the rim well and the wall or web elements, and thus closes the U-profile. The transverse walls are adhesively bonded first of all into the U-profile, likewise by means of an elastomeric adhesive, which transverse walls for their part divide the circumferential profile into a plurality of air volumes. In the present case, the required narrow openings for forming the oscillating mass for the Helmholtz resonators are made in the cover element. On account of the multiplicity of separate components which are to be installed and the adhesive bonding of the components, this solution is associated with a considerable outlay on assembly. To counteract this circumstance, a plurality of documents have disclosed providing prefabricated Helmholtz resonators and fastening the latter to the rim in the region of the rim well, in particular in a positively locking manner. Helmholtz resonators which are produced, for example, from plastic by blow molding are substantially provided which for their part have latching means, by means of which the Helmholtz resonators latch into prepared latching receptacles of the circumferential wall or web elements. The outlay on installation is certainly reduced by way of this measure. Regardless of this, an increase in the weight of the Helmholtz resonator is to be observed, since the Helmholtz resonator, in addition to a cover element and two end face elements, now additionally has a bottom element and the latching means (for example, EP 1 990 213 A1, EP 2 052 876 A1, US 2010/0090520 A1, US 2010/0096909 A1).

Disclosed embodiments provide a rim which is improved further with regard to the prior art having at least one device for the absorption of sound in a Helmholtz resonator, the outlay of which on material, installation and accordingly cost is minimized for configuring the at least one Helmholtz resonator.

LIST OF DESIGNATIONS

1 Vehicle
2 Vehicle wheel
3 Tire/vehicle tire
4 Rim
5 Rim well
6 Rim flange
7 Wheel disk
8 Tire interior
9 Helmholtz resonator
10 Air volume
11 Opening
12 Wall element
13 Web element
14 Cover element
14a Covering face
14b Side webs
14c Transverse webs
15 Transverse walls
16 Recess
16a Recess bottom
16b Side wall
16c Side wall
17 Recess
18 Projection
19 Positively locking means
20 Cutout
21 Intermediate spaces
22 Teeth
23 Contact face
24 Sealing element
25 Means for reinforcement
26 Through opening
27 Side edges
28 Web element
29 Flanges
30 Cutouts
31 Snap-in tabs
32 Receiving groove
33 Directional arrow (mounting direction)
34 Fastening domes
35 Fastening openings
36 Recess
37 End flange

The invention claimed is:

1. A rim onto which a vehicle tire is pulled, the rim comprising:
a rim well on which at least one device for absorbing sound in the manner of a Helmholtz resonator with an at least partially annular air volume and at least one opening to the tire interior is arranged, and
said air volume of the Helmholtz resonator is formed by the rim well by radially oriented and at least partially circumferential wall and/or web elements, which are arranged spaced apart from one another on the rim well as viewed in the axial direction of the rim, and
by a cover element or by a cover element and transverse walls, which delimit the air volume in the circumferential direction,
wherein the cover element is connected to the wall and/or web elements in a positively locking manner and in an airtight manner,
wherein the cover element is connected in an airtight manner to the wall and/or web elements and/or the rim well by at least one sealing element.

2. The rim of claim 1, wherein the cover element has, for the radially and axially fixed connection of said cover element to the rim, side webs which are positioned radially and run in the circumferential direction of the rim with axially outwardly pointing positively locking means in the form of latching elements which for their part latch with groove-shaped cutouts which are provided in the wall and/or web elements by radial placing of the cover element onto a circumferential groove which is formed by the wall and/or web elements and the rim well.

3. The rim of claim 1, wherein the cover element has transverse walls, which are configured in one piece with said cover element, for delimiting the air volume, which transverse walls for their part are supported with their free end on the rim well.

4. The rim of claim 3, wherein the transverse walls which are formed by the cover element run in a radially oblique manner toward the rim well and are supported on the latter.

5. The rim of claim 1, wherein the at least one sealing element extends into the contact region of the transverse walls of the cover element with the rim well.

6. The rim of claim 1, wherein the at least one sealing element is configured as a separate attachment component or in one piece with the cover element.

7. The rim of claim 1, wherein the cover element is of cup-like or shell-like configuration.

8. The rim of claim 1, wherein the cover element has means for reinforcing said cover element.

9. The rim of claim 1, wherein the cover element is composed of metal and/or plastic and/or composite material.

10. A vehicle wheel or a vehicle having a rim as claimed in claim 1.

11. A rim onto which a vehicle tire is pulled, the rim comprising:
a rim well on which at least one device for absorbing sound in the manner of a Helmholtz resonator with an at least partially annular air volume and at least one opening to the tire interior is arranged, and
said air volume of the Helmholtz resonator is formed by the rim well by radially oriented and at least partially circumferential wall and/or web elements, which are arranged spaced apart from one another on the rim well as viewed in the axial direction of the rim, and by a cover element or by a cover element and transverse walls which delimit the air volume in the circumferential direction, wherein the cover element is connected to the wall and/or web elements in an airtight manner,
wherein the cover element firstly has, for the radially fixed connection of said cover element to the rim, side webs which are positioned radially and run in the circumferential direction of the rim, the free end of which side webs is formed in each case by an axially positioned flange, said flanges are oriented in the same direction and penetrating, by way of axial displacement of the cover element relative to the rim, into in each case one groove-shaped cutout which is provided in the wall and/or web elements, and secondly has, for the axially fixed connection of said cover element to the rim, a multiplicity of snap-in tabs which are arranged one behind another as viewed in the circumferential direction of the rim and point counter to the displacement direction, the free end of which snap-in tabs is snapped into a corresponding receiving groove of the rim in the mounted state of the cover element.

12. The rim of claim 11, wherein the snap-in tabs are configured in one piece with the cover element.

13. The rim of claim 11, wherein the receiving groove which corresponds to the snap-in tabs is formed by at least one wall or web element which is positioned radially to the outside, starting from the rim well, and runs around at least partially in the circumferential direction of the rim.

14. The rim of claim 11, wherein the axially positioned flange which is arranged on that side of the cover element which lies axially opposite the snap-in tabs merges into an end flange which is positioned radially to the outside.

* * * * *